United States Patent
Kitagawa

(10) Patent No.: US 7,773,467 B2
(45) Date of Patent: Aug. 10, 2010

(54) OPTICAL DISK DEVICE

(75) Inventor: Kazuto Kitagawa, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 717 days.

(21) Appl. No.: 11/527,456

(22) Filed: Sep. 27, 2006

(65) Prior Publication Data

US 2007/0070836 A1 Mar. 29, 2007

(30) Foreign Application Priority Data

Sep. 27, 2005 (JP) ............................. 2005-279812

(51) Int. Cl.
*G11B 7/00* (2006.01)
(52) U.S. Cl. .................................. 369/44.11; 369/116
(58) Field of Classification Search ....................... None
See application file for complete search history.

(56) References Cited

U.S. PATENT DOCUMENTS

| | | | |
|---|---|---|---|
| 5,384,524 A * | 1/1995 | Romano | 318/569 |
| 5,706,264 A * | 1/1998 | Ando | 369/47.44 |
| 2003/0117087 A1* | 6/2003 | Barth et al. | 315/291 |
| 2004/0143771 A1* | 7/2004 | Minabe et al. | 713/300 |

FOREIGN PATENT DOCUMENTS

| | | |
|---|---|---|
| JP | 05-062230 | 3/1993 |
| JP | 05054518 | 3/1993 |
| JP | 05242590 | 9/1993 |
| JP | 06-325396 | 11/1994 |
| JP | 2002186292 | 6/2002 |

OTHER PUBLICATIONS

Japanese Office Action dated Nov. 28, 2007 in corresponding Japanese patent application.

* cited by examiner

*Primary Examiner*—Wayne R Young
*Assistant Examiner*—Carl Adams
(74) *Attorney, Agent, or Firm*—Pillsbury Winthrop Shaw Pittman, LLP

(57) ABSTRACT

A drive stoppage command unit commands a drive unit to stop driving a pickup head, and an objective lens of a pickup head, when it has decided that the power supply voltage of operating power which is being supplied by a first power supply unit to a servo control unit is less than or equal to a first voltage. Furthermore, the drive stoppage command unit also commands the drive unit to stop driving the pickup head and the objective lens, if stoppage of the driving of the pickup head and of the objective lens has been decided upon by a logic control unit.

2 Claims, 3 Drawing Sheets

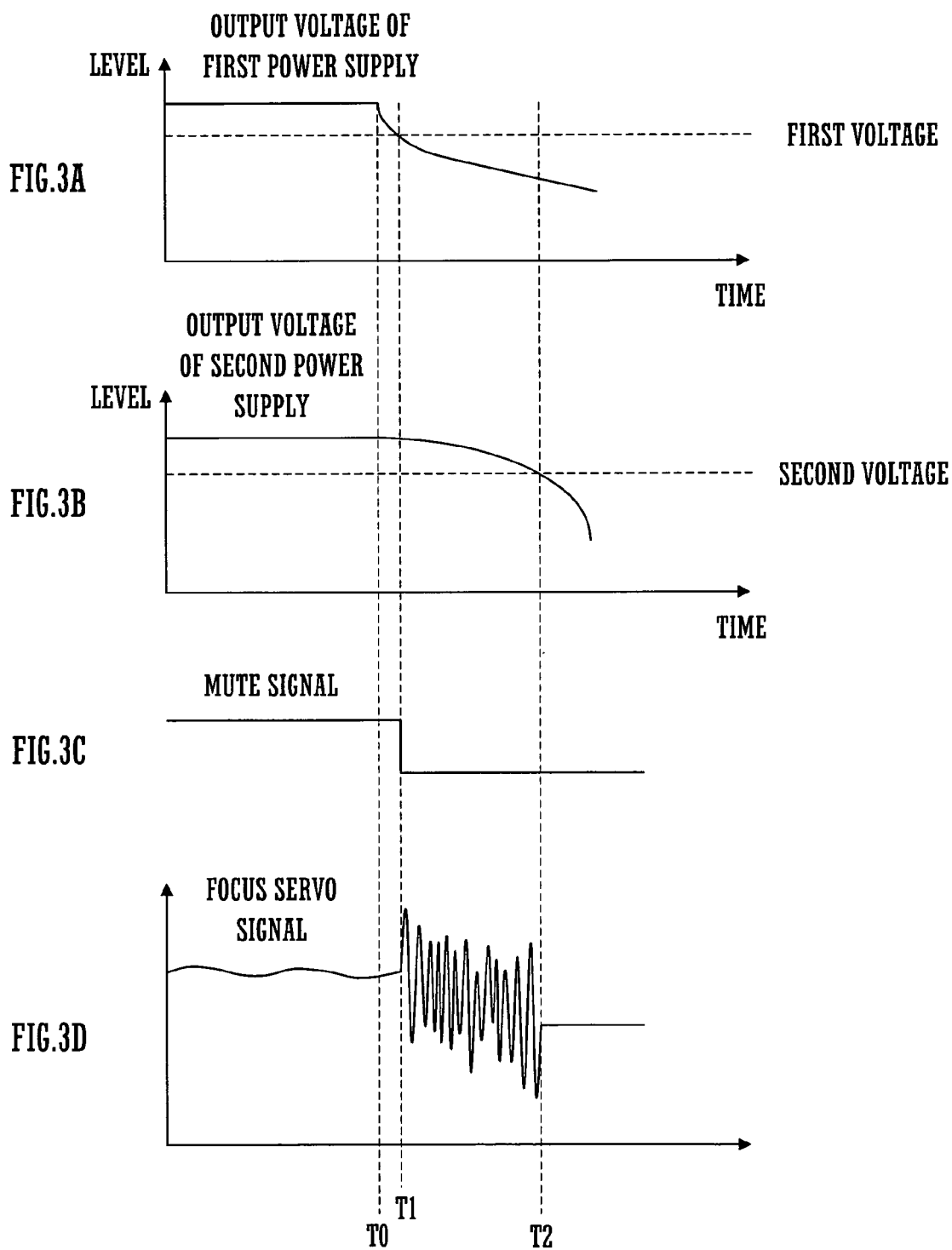

OPTICAL DISK DEVICE

CROSS REFERENCE

This Nonprovisional application claims priority under 35 U.S.C. §119(a) on Patent Application No. 2005-279812 filed in Japan on Sep. 27, 2005, the entire contents of which are hereby incorporated by reference.

BACKGROUND OF THE INVENTION

The present invention relates to an optical disk device which reads and replays data recorded upon an optical disk such as a DVD or the like.

In the prior art, optical disk devices which read and replay data recorded upon optical disks such as DVDs or the like are per se widely known and very popular. As is per se well known, such an optical disk device irradiates laser light upon the recording surface of an optical disk, and reads the data which is recorded upon that optical disk by detecting the light reflected therefrom. In such an optical disk device various types of servo control are performed when reading data from the optical disk, such as rotational speed control of the optical disk (rotational speed control of the spindle motor), control for condensing the laser light irradiated towards the optical disk onto the recording surface of the optical disk (so called focus control), control for irradiating the laser light which is irradiated upon the optical disk into the center of the track from which the data is being read (so called tracking control), and the like. In an optical disk device, there is included a servo control unit which generates, from the light which is detected after having been reflected from the optical disk, servo signals which are used for drive control of the spindle motor, the pickup head, an objective lens included in this pickup head, and so on. Moreover, there are provided various types of driver which drive the spindle motor, a thread motor which shifts the pickup head, and an actuator which supports the objective lens, based upon the servo signals generated by the servo control unit.

Since this servo control uses servo signals which, as described above, are created from the light which has been detected after being reflected from the optical disk, it becomes unstable if it experiences an influence when starting operation, or due to extraneous light. Proposals for preventing the occurrence of erroneous operation of the servo mechanism at such times when the drive units cannot be adequately driven are put forward in Japanese Laid-Open Patent Publication H05-62230 and Japanese Laid-Open Patent Publication H06-325396.

However, with a conventional type of optical disk device, the power supply which supplies operating power to the servo control unit which generates the servo signals, and the power supply which supplies operating power to a logic control unit which commands the drivers which drive the motors and actuators or the like whether or not to stop driving the pickup head and the objective lens, are different power supplies. Due to this, during replay of an optical disk or the like, if the user has mistakenly pulled out the AC cord or the like, due to the characteristics of the two power supplies, a difference arises between the rate of decrease of the voltage of the supply of operational power to the servo control unit, and the rate of decrease of the voltage of the supply of operational power to the logic control unit. As a result, sometimes the situation occurs that the servo control unit cannot operate in an adequate manner, before the logic control unit issues a command for stopping the drivers driving the pickup head and/or the objective lens. In other words, it may happen that, before the voltage of the supply of operating power to the logic control unit decreases to less than or equal to a voltage which can operate this logic control unit in an adequate manner, the voltage of the supply of operating power to the servo control unit decreases to less than or equal to a voltage which can operate this servo control unit in an adequate manner. Since, in this case, the logic control unit does not command the drivers to stop driving the pickup head and the objective lens, irrespective of whether or not the servo signal which is generated by the servo control unit is an improper signal, accordingly the drivers continue to drive the pickup head and/or the objective lens based upon an improper servo signal which is generated by the servo control unit, so that there has been a problem of inviting failure of the main part of the optical disk device.

The object of the present invention is to provide an optical disk device with which the reliability is enhanced by a command being rapidly issued to the driver to stop driving of the pickup head and of the objective lens, when a situation occurs in which the power supply to a servo control unit which creates a servo signal cannot be performed in a normal manner.

SUMMARY OF THE INVENTION

The optical disk device of the present invention includes: a servo control unit which generates a servo signal which is used for controlling the irradiation position of laser light which a pickup head irradiates upon an optical disk; and a drive unit which drives the pickup head, and an objective lens provided to this pickup head, based upon the servo signal generated by this servo control unit. Furthermore, there is included a drive stoppage command unit which commands the drive unit to stop driving the pickup head and the objective lens. Moreover, there is included a logic control unit which decides whether or not the driving of the pickup head and the objective lens by the drive unit should be stopped, and inputs the result of this decision to the drive stoppage command unit.

When it has been decided that the power supply voltage which is being supplied by the first power supply unit to the servo control unit as operating power is less than or equal to a first voltage, the drive stoppage command unit commands the drive unit to stop driving the pickup head and the objective lens. It is desirable for this first voltage to be the lower limit of voltage at which it is possible to operate the servo control unit properly. By the first voltage being determined in this manner, the servo control unit is able rapidly to command the drive unit to stop driving the pickup head and the objective lens, when a situation has come about in which it is not possible to continue with proper operation, due to decrease of the voltage of the supply of operating power. Due to this, it is possible to prevent the occurrence of a state of affairs in which the drive unit drives the pickup head and the objective lens based upon an inadequate servo signal which is created by the servo control unit while it cannot operate properly due to decrease of the voltage of its supply of operating power, so that thereby the device main part becomes damaged. Accordingly, it is possible to anticipate an enhancement of the reliability of this optical disk device.

Furthermore, the drive stoppage command unit also commands the drive unit to stop driving the pickup head and the objective lens, if it has been decided by the logic control unit that the driving of the pickup head and of the objective lens should be stopped. Accordingly, it is also possible rapidly to command the drive unit to stop driving the pickup head and the objective lens, when the logic control unit has decided to stop driving of the pickup head and of the objective lens.

BRIEF DESCRIPTION OF THE DRAWINGS

FIGS. 3A-3D are time charts of signals of this optical disk device which is an embodiment of the present invention.

DETAILED DESCRIPTION OF THE INVENTION

Figure 1:
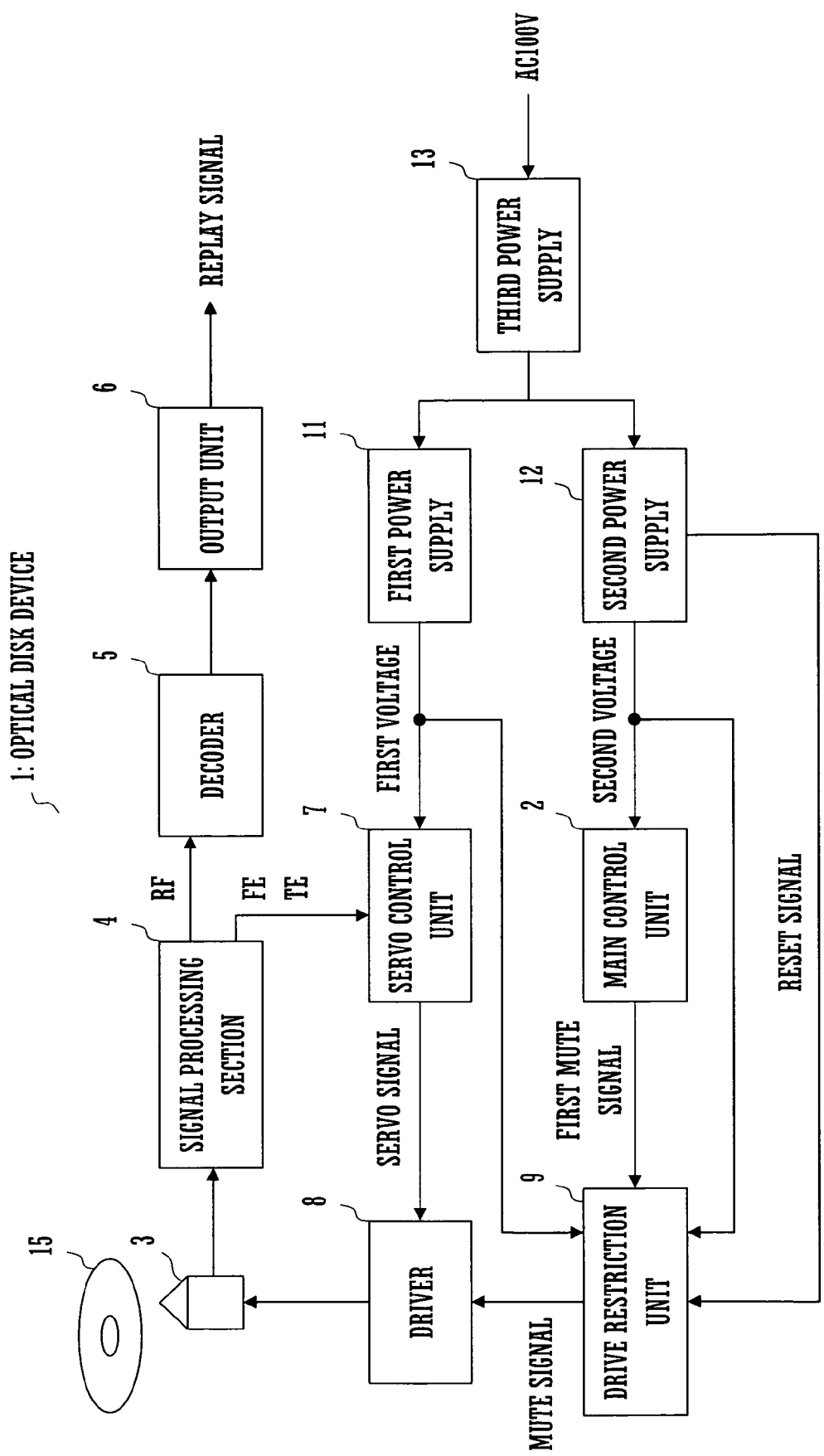
FIG. 1 is a block diagram showing the structure of the main portion of an optical disk device which is an embodiment of the present invention.

FIG. 1 is a block diagram showing the structure of the main portion of an optical disk device which is an embodiment of the present invention. The optical disk device of this embodiment is a device which replays the contents of a program or the like which is recorded upon an optical disk 15 such as a DVD or the like. The optical disk device 1 of this embodiment comprises a main control unit 2 which controls the operation of the various sections of the main part of the device, and a pickup head 3 (hereinafter termed the PU 3) which detects and outputs the amount of light which is reflected. Furthermore, the optical disk device 1 comprises a signal processing section 4 which process the output signal of the PU 3 and creates a read signal (the RF signal) for the data which is recorded upon the optical disk 15, a wobble signal which indicates the rotational speed of the optical disk 15, a focus error signal (the FE signal) which indicates the focus deviation, a tracking error signal (the TE signal) which indicates the tracking deviation, and the like. Furthermore, this optical disk device 1 comprises a decoder 5 which processes the RF signal generated by the signal processing section 4 and extracts the data which is recorded upon the optical disk 15 and decodes this data, and an output unit 6 which creates and outputs a replay signal based upon the data which has been decoded by the decoder 5. Moreover, the optical disk device 1 comprises a servo control unit 7 which creates servo control signals for various types of servo control using the wobble signal, the FE signal, the TE signal, and so on created by the signal processing section 4, a driver 8 which drives the PU 3 main part and the objective lens (not shown in the figure) of the PU 3 and the like based upon the servo control signals created by the servo control unit 7, and a drive restriction unit 9 which commands this driver 8 whether or not to stop the driving of the PU 3 main part, the objective lens of the PU 3, and the like. Yet further, the optical disk device 1 comprises a first power supply which provides operating power to the servo control unit 7, a second power supply 12 which provides operating power to the main control unit 2, and a third power supply 13 which provides operating power to the first power supply 11 and the second power supply 12. This third power supply 13 is an AC-DC power supply. Furthermore, the third power supply 13 is a power supply which provides electrical power, not only to the first power supply 11 and the second power supply 12, but, according to requirements, to other sections of the device main part as well.

The main control unit 2 comprises a logic control unit according to the present invention. This main control unit 2 decides whether or not the driving by the driver 8 of the various sections such as the PU main part and the objective lens of the PU 3 and so on should be stopped. The main control unit 2 inputs a first mute signal which specifies the result of this decision to the drive restriction unit 9. In a prior art device, this first mute signal was used as a mute signal for the driver 8. The PU 3 comprises a light emitting element (LD) which irradiates laser light upon the optical disk 15, an objective lens which condenses the laser light which is emitted from the LD, a light receiving element (PD) which detects the light reflected from the optical disk 15, and the like. The objective lens of the PU 3 is mounted upon an actuator, and is driven by that actuator to and fro in the direction towards and away from the optical disk 15 (i.e. in the focus direction), and also in the radial direction of the optical disk 15 (i.e. in the tracking direction). Moreover, the main part of the PU 3 is mounted upon a shaft so as to be freely shiftable along the radial direction of the optical disk 15. This PU main part is driven in the radial direction of the optical disk 15 along this shaft by a thread motor not shown in the figures. Furthermore, in order to control its tilt angle, the optical disk device 1 comprises a tilt sensor (not shown in the figures) which detects the tilt angle, and a tilt adjustment unit (also not shown in the figures) by which the PU 3 is rotationally driven around the shaft upon which it is mounted. Moreover, the optical disk device comprises a spindle motor (also not shown in the figures) which rotates an optical disk 15 which is set in its main portion.

The signal detected by the PD of the PU 3 is inputted to the signal processing section 4. The PD of the PU 3, as is per se well known, is a light receiving element whose light receiving region is segmented into two sections in the vertical direction and four sections in the horizontal direction. The amounts of reflected light detected by each of the light receiving regions on the PD are each inputted to the signal processing section 4. From these reflected light amounts from the light receiving regions which have thus been detected, the signal processing section 4 creates the RF signal, the focus error signal (the FE signal), the tracking error signal (the TE signal), the wobble signal, and so on. The RF signal is the read signal for the data which is recorded upon the optical disk 15. The FE signal is a signal which specifies the amount of deviation between the recording surface of the optical disk 15 and the position of condensation of the laser light which is irradiated upon this optical disk 15. The TE signal is a signal which specifies the amount of deviation between the center of the track formed upon the optical disk 15 and the position of irradiation of the laser light which is irradiate upon this optical disk 15. And the wobble signal is a signal which specifies the speed by which the optical disk 15 is being rotated by the spindle motor not shown in the figures.

The RF signal which has been generated by the signal processing section 4 is inputted to the decoder 5. The decoder 5 processes this RF signal which has been inputted, and, along with extracting the data which is recorded upon the hard disk, also decodes this extracted data. The data which is recorded upon the optical disk 15 is encoded according to MPEG or the like. The output unit 6 generates and outputs a replay signal (a replay video signal and a replay audio signal) based upon the data which has been decoded by the decoder 5. To the output unit 6 there are connected a display device (not shown in the figures) to which the replay video signal is inputted, and a speaker (not shown in the figures either) to which the replay audio signal is inputted.

The FE signal, the TE signal, the wobble signal, and the output of the tilt sensor not shown in the figures (a signal which represents the tilt angle which has been detected) and the like are inputted to the servo control unit 7. And, by using this FE signal which is inputted, the servo control unit 7 creates a focus servo signal for driving the objective lens of the PU 3 in the focus direction. Furthermore, by using the TE signal which is inputted, the servo control unit 7 creates a tracking servo signal for driving the main part of the PU 3, or the objective lens of the PU 3, in the tracking direction.

Moreover, by using the wobble signal which is inputted, the servo control unit 7 creates a servo signal for controlling the rotational speed of the optical disk 15. Furthermore, by using the output of the tilt sensor which is inputted, the servo control unit 7 creates a servo signal for rotating the PU 3 around the shaft upon which it is mounted. The servo control unit inputs these various types of servo signal which it has generated to the driver 8.

Based upon these various types of servo signal, the driver 8 drives the actuator which holds the objective lens of the PU 3, the thread motor which shifts the PU 3 main part along its shaft, the spindle motor which rotates the optical disk 15, and the tilt adjustment unit which rotates the PU 3 about the shaft upon which it is mounted. Furthermore, the drive restriction unit 9 inputs to the driver 8 a mute signal which commands whether or not to stop the driving of the various parts such as the main part of the PU 3 and the objective lens of the PU 3 and so on. When a mute signal is inputted to the effect that driving of the various parts such as the main part of the PU 3 and the objective lens of the PU 3 and so on is to be stopped, the driver 8 stops driving these various parts. The drive restriction unit 9 inputs to the driver 8 a mute signal to the effect that driving of the various parts is to be stopped, when the power supply voltage which is supplied by the first power supply 11 to the servo control unit 7 drops to less than or equal to a first voltage A which is determined in advance. Furthermore, the drive restriction unit 9 also inputs a mute signal to the driver 8 to the effect that driving of the various parts is to be stopped, when the main control unit 2 decides that the driving by the driver 8 of the various parts such as the main part of the PU 3 and the objective lens of the PU 3 and so on is to be stopped.

The first power supply 11 is a power supply circuit which employs transistors and whose voltage at normal times is x V; and, here, it is a 1.2 V power supply. The output voltage of this first power supply 11 at normal times is a voltage which is capable of operating the servo control unit 7 in a normal manner, and is a voltage which is higher than a first voltage A. Furthermore, the second power supply 12 is a power supply circuit which employs a regulator and whose voltage at normal times is y V; and, here, it is a 3.3 V power supply. The output voltage of this second power supply 12 at normal times is a voltage which is capable of operating the main control unit 2 in a normal manner, and moreover is a voltage which is higher than a second voltage B which will be described hereinafter, and which also is higher than the output voltage x V of the first power supply 11. Yet further, the output voltage of the third power supply 13 is z V—here, 9 V—and is a voltage which is higher than the output voltage y V of the second power supply 11. Moreover, here, the first voltage A is 0.9 V and the second voltage B is 2.7 V. This first voltage A is a voltage which is approximately the lower limit at which it is possible to operate the servo control unit 7 in an adequate manner. And the second voltage B is a voltage which is approximately the lower limit at which it is possible to operate the main control unit 2 in an adequate manner. Furthermore, the second power supply circuit 12 is constructed so as to measure its own output voltage, in other words the voltage of the operating power which is being supplied to the main control unit 2, and so as to make a decision as to whether or not this voltage which it has measured is less than or equal to a second voltage B. The second power supply circuit 12 inputs to the main control unit 2 a reset signal which specifies the result of this decision as to whether or not its output voltage is less than or equal to the second voltage B. And, if the main control unit 2 inputs from the second power supply circuit 12 a reset signal which specifies the decision result that the output voltage is less than the second voltage B, then it decides that the driving by the driver 8 of the main part of the PU 3 and the objective lens of the PU 3 and so on should be stopped, and accordingly inputs the first mute signal to the driver 8. In other words, the main control unit inputs the first mute signal to the driver 8, when the power supply voltage which is being supplied by the second power supply 12 decreases below the second voltage B which is determined in advance.

Next, the operation of this optical disk device 1 which is an embodiment of the present invention will be explained. The optical disk device 1 of this embodiment is a replay device which, as described above, reads data recorded upon an optical disk 15 such as a DVD or the like. The replay operation by the optical disk device 1 of this embodiment will now be described in simple terms. The optical disk device 1 rotates an optical disk 15 which is set into its device main part by the spindle motor not shown in the figures. At this time, the optical disk device 1 performs rotational speed control so as to control the rotational speed of the spindle motor so that, for example, constant linear velocity. Furthermore, the optical disk device 1 drives the objective lens of the PU 3 along its focus direction with its actuator, and performs focus control so as to make the position at which the laser light is irradiated by the PU 3 upon the optical disk 15 coincide with the recording surface of this optical disk 15. Moreover, the optical disk device 1 drives the objective lens of the PU 3 along the tracking direction with its actuator, and performs tracking control so that the laser light which is irradiated upon the optical disk 15 by the PU 3 coincides with the center of the track upon which the data which is being read from this optical disk 15 is recorded. During this tracking control, according to requirements, the main part of the PU 3 is driven along the tracking direction by the thread motor. Furthermore, by rotating the PU 3 with the tilt drive unit around the shaft upon which it is mounted, the optical disk device 1 also performs tilt control and so on so as to make the laser light which is being irradiated from the PU 3 meet the recording surface of the optical disk 15 approximately vertically. The rotational speed control, the focus control, the tracking control, and the tilt control explained here are representative of the types of servo control performed by this optical disk device 1.

With the signal processing section 4, the optical disk device 1 creates an RF signal, which is a signal representing the sum of the light amounts reflected from the optical disk 15 as detected by the various regions of the PD of the PU 3, and inputs it to the decoder 5. The decoder 5 extracts the data recorded upon the optical disk 15 from this RF signal. The data which is extracted by the decoder 15 is a program stream in which the video data and the audio data are packetized in predetermined units. The decode 5 separates this program stream into the video data and the audio data. And the decoder 5 decodes each of the video data and the audio data which have thus been separated, and inputs the decoded video data and the audio data to the output unit 6. The output unit 6, along with outputting a replay video signal based upon the video data which has been inputted from the decoder 5, also outputs a replay audio signal based upon the audio data. The replay video signal and the replay audio signal are inputted to a display device and to a speaker which are connected to the output unit 6, so that, along with an image being displayed upon this display device, sound is also outputted upon the speaker.

Now, the servo control for this optical disk device during replay will be explained. First, the rotational speed control will be explained. The signal processing section 4 creates the wobble signal from the amounts of light reflected from the optical disk 15 as detected by each of the regions of the PD of the PU 3, and inputs it to the servo control unit 7. The servo control unit 7 creates a servo signal which controls the rotational speed of the spindle motor so that the frequency of this wobble signal is held to a frequency which is determined in advance, and inputs this servo signal to the driver 8. And the driver 8 rotates the spindle motor based upon the servo signal which has been inputted from the servo control unit 7.

Next, the focus control will be explained. The signal processing section 4 creates the FE signal from the amounts of light reflected from the optical disk 15 as detected by each of the regions of the PD of the PU 3, and inputs it to the servo control unit 7. The servo control unit 7 creates a focus servo signal which drives the objective lens of the PU 3 in the focus direction, using the FE signal which is inputted, so that the position of condensation of the laser light which is emitted from the LD of the PU 3 coincides with the recording surface of the optical disk 15, and inputs this servo signal to the driver 8. And the driver 8 drives the actuator based upon this focus servo signal, and shifts the objective lens of the PU 3 in the focus direction.

Next, the tracking control will be explained. The signal processing section 4 creates the TE signal from the amounts of light reflected from the optical disk 15 as detected by each of the regions of the PD of the PU 3, and inputs it to the servo control unit 7. And the servo control unit 7 creates a tracking servo signal which drives the main part of the PU 3, or the objective lens of the PU 3, in the tracking direction, using the TE signal which is inputted, so that the position at which the laser light which is emitted from the LD of the PU 3 is irradiated coincides with the center of the track from which the data is read, and inputs it to the driver 8. And the driver 8 drives the thread motor or the actuator based upon this tracking servo signal, and shifts the main part of the PU 3, or the objective lens of the PU 3, in the tracking direction.

Furthermore, the signal processing section 4 inputs to the servo control unit 7 the signal which specifies the tilt angle as detected by the tilt sensor. And the servo control unit creates, from this signal specifying the tilt angle which has been inputted, a servo signal which rotates the shaft upon which the PU 3 is mounted so that the laser light which is emitted from the LD of the PU 3 is irradiated approximately vertically upon the recording surface of the optical disk 15, and inputs it to the driver 8. The driver 8 drives the tilt adjustment unit based upon this servo signal, and thereby rotates the shaft upon which the PU 3 is mounted. And the optical disk device 1 performs the various types of servo control described above continuously while replay of the data which is recorded upon the optical disk 15 is being performed. However, when the driver 8 has inputted from the drive restriction unit 9 a mute signal to the effect that the driving of the various parts such as the PU main part and the objective lens of the PU 3 and so on is to be stopped, then the driving of the various parts by the actuator, the spindle motor, the thread motor, and the tilt adjustment unit by which the objective lens of the PU 3 is supported is stopped.

Figure 2:
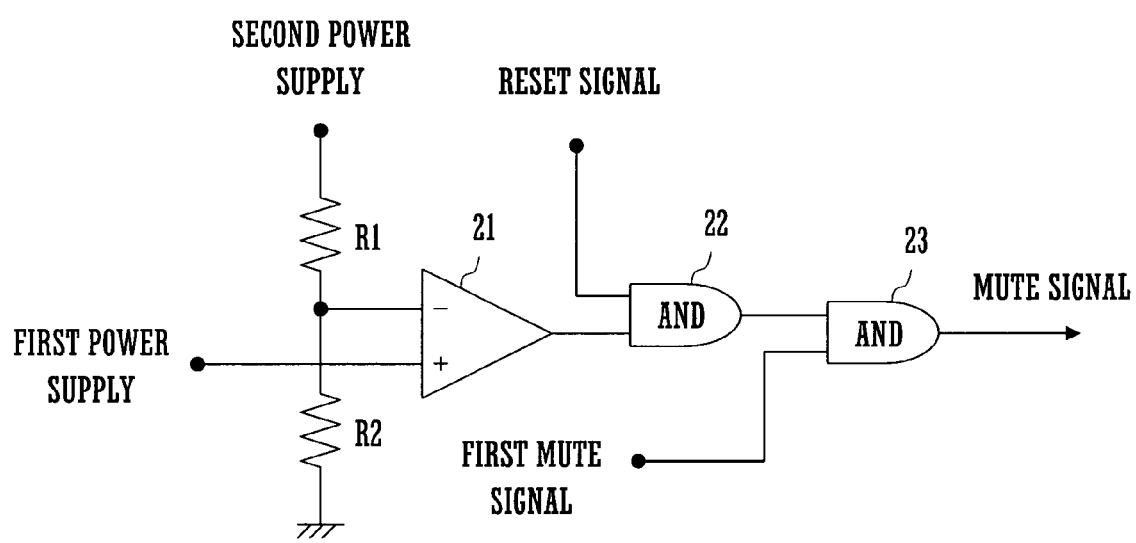
FIG. 2 is a figure showing the structure of a drive portion of this optical disk device which is an embodiment of the present invention.

FIG. 2 is a figure showing the structure of the drive restriction unit 9 of this optical disk device which is an embodiment of the present invention. This drive restriction unit 9 comprises a comparator 21, a circuit which ANDs together the output of the comparator 21 and the reset signal which is inputted from the second power supply 12, and a circuit 23 which ANDs together the output of the AND circuit 22 and the first mute signal which is inputted from the main control unit 2. And the drive restriction unit 9 inputs the output of the AND circuit 23 to the driver 8 as a mute signal. The output voltage of the first power supply 11 is inputted to the +terminal of the comparator 21, and the output voltage of the second power supply 12 is inputted to its—terminal while being voltage divided by resistors R1 and R2. At normal times, the voltage which is inputted to the—terminal of the comparator 21 is determined by the resistors R1 and R2 so as to become the first voltage A, which is a voltage of approximately the lower limit which can operate the servo control unit 7 in an adequate manner. Although the operational power supply for the comparator 21 is not shown in the figures, it is supplied by the second power supply 12. Accordingly, the comparator 21 compares together the output voltage of the first power supply 11, and the first voltage A which is approximately the lower limit for the voltage which can operate the servo control unit 7 in an adequate manner, and outputs the result of this comparison. And the comparator 21 outputs H when the output voltage of the first power supply 11 is higher than the first voltage A, and outputs L when the output voltage of the first power supply 11 is less than or equal to the first voltage A.

The AND circuit 11 outputs the AND of the output of the comparator 21 and the reset signal which is outputted from the second power supply 12. This reset signal is H when the output voltage of the second power supply 12 is higher than the second voltage B which is approximately the lower limit voltage which can operate the main control unit 2 in an adequate manner, and is L when it is less than or equal to that second voltage. This reset signal is a signal which is outputted from the second power supply 12, and is inputted to the main control unit 2 and to the drive restriction unit 9 in parallel. Furthermore, the AND circuit 23 outputs the AND of the output of the AND circuit 22 and the first mute signal which is outputted by the main control unit 2. The first mute signal which is outputted by the main control unit 2 is H when the reset signal which is inputted from the second power supply 12 is H, and is L when this reset signal which is inputted from the second power supply 12 is L. In other words, this first mute signal is a signal which, at normal times, changes so as to follow the reset signal, while, when an anomaly such as a failure in the circuit network or the like has occurred, according to circumstances, it may also not change to follow the reset signal. The output of the AND circuit 23 is the mute signal for the driver 8. In other words, when at least one of the following three conditions holds, then the drive restriction unit 9 outputs a mute signal which commands the driver 8 to stop the driving of the various parts:

(1) the output voltage of the first power supply 11 is less than or equal to the first voltage A;

(2) the output voltage of the second power supply 12 is less than or equal to the second voltage B;

(3) the main control unit 2 is outputting a mute signal which commands the driver 8 to stop driving the various parts.

To put it in another manner, when the situation is that at least one of these conditions (1) through (3) is satisfied, then the driving of the various parts such as the main part of the PU 3, the objective lens of the PU 3 and so on by the driver 8 is stopped.

Due to this if, during the replaying of an optical disk 15 which is set in the main part of the optical disk device 1, the user mistakenly has pulled out the AC power supply cord or the like, even if, due to a discrepancy of circuit structure between the first power supply 11 and the second power supply 12 or the like, as shown in FIGS. 3A and 3B, a timing difference occurs between the time point T1 at which the output voltage of the first power supply 11 becomes less than the first voltage A at which it is possible to operate the servo control unit 7 in an adequate manner, and the time point T2 at which the output voltage of the second power supply 12 becomes less than or equal to the second voltage B at which it is possible to operate the main control unit 2 in an adequate manner, still it is possible to input (refer to FIG. 3C a mute signal (the L level of the mute signal), so as to stop the driving by the driver 8 of the various sections at the earlier time point (T1 in FIG. 3A-3D). Due to this, in a situation in which the servo control unit 7*y* is not operating properly, or in a situation in which the main control unit 2 is not operating properly, it is possible to prevent driving of the various sections of the device by the driver 8. As a result, it is possible to prevent failure of the main part of the device, and thus it is possible to anticipate an enhancement of the reliability of the main part of the device.

The point T0 shown in FIGS. 3A-3D is the timing at which the power supply plug is pulled out of its socket. Furthermore in FIGS. 3A-3D, the case is shown in which, timewise, the time point T1 at which the output voltage of the first power supply 11 becomes less than or equal to the first voltage A at which it is possible to operate the servo control unit 7 in an adequate manner, is earlier than the time point T2 at which the output voltage of the second power supply 12 becomes less than or equal to the second voltage B at which it is possible to operate the main control unit 2 in an adequate manner. Between these time points T1 and T2, the drive signal which is generated by the servo control unit 7 becomes a signal whose amplitude fluctuates wildly, as shown in FIG. 3D, since the servo control unit 7 is not operating properly. For example, in FIG. 3D, the focus servo signal generated by the servo control unit 7 is shown. With the optical disk device 1 of this embodiment, since the mute signal inputted by the driver 8 goes to L level at the time point T1 shown in FIGS. 3A-3D, accordingly the improper servo signals which are generated by the servo control unit 7 during the interval T1 to T2 are not used for driving the various sections of the device.

In this manner, with the optical disk device 1 of this embodiment, it is possible rapidly to stop the driving of the various sections by the driver 8, when a situation has arisen in which the servo control unit 7 or the main control unit 2 cannot operate in an adequate manner.

Furthermore, since the third power supply 13 is provided which performs supply of electrical power to the first power supply 11 and to the second power supply 12, accordingly it is possible to build the first power supply 11 and the second power supply 12 with simple circuitry which employs transistors and regulators, so that it is possible to suppress increase in the cost of the main portion of this optical disk device 1.

Moreover, since as described above the first mute signal changes along with the reset signal, accordingly it would be acceptable not to provide the AND circuit 22 to the drive restriction unit 9. In this case, the output of the comparator 21 should be inputted to the AND circuit 23.

It should be understood that although, in the embodiment described above, it was arranged for the driver 8 to stop the operation of all of the drive units, when a mute signal to the effect that the driving of the various sections should be stopped was inputted from the drive restriction unit 9, it would also be acceptable to arrange for only the operation of one portion of the drive units to be stopped. Furthermore, it would also be acceptable to constitute the main control unit 2 and the servo control unit 7 as a single microcomputer.

Finally, it should be understood that all of the features of the above described embodiment are given by way of example, and are not to be considered as being limitative of the present invention. The range of the present invention is specified, not by any of the features of the embodiment described above, but by the scope of the appended Claims.

Moreover, it is intended for the range of the present invention to include equivalents to all of the items in the Claims, and variations upon those items within the scope of the Claims.

What is claimed is:

1. An optical disk device, comprising:
    a read unit, comprising a pickup head which irradiates laser light upon an optical disk and detects reflected light therefrom, and which reads data recorded upon the optical disk with this pickup head;
    a servo control unit which, during reading by the read unit of the data recorded upon the optical disk, generates, from the light reflected by the optical disk and detected by the pickup head, a servo signal which is used for controlling the irradiation position of the laser light which the pickup head irradiates upon the optical disk;
    a drive unit which drives the pickup head, and an objective lens provided to this pickup head, based upon the servo signal generated by the servo control unit;
    a drive stoppage command unit which commands the drive unit to stop driving the pickup head and the objective lens;
    a logic control unit which decides whether or not the driving of the pickup head and the objective lens by the drive unit should be stopped, and inputs a result of the decision to the drive stoppage command unit;
    a first power supply unit which supplies a first power supply voltage to the servo control unit as operating power; and
    a second power supply unit which supplies a second power supply voltage to the logic control unit as operating power,
    wherein:
        the second power supply unit decides whether or not the second power supply voltage is less than or equal to a predetermined second voltage, and outputs a second power supply unit signal showing a result of the decision, to the logic control unit and to the drive stoppage command unit in parallel;
        when the second power supply unit signal shows that the second power supply voltage is less than or equal to the second voltage, the logic control unit decides whether or not the driving of the pickup head and of the objective lens should be stopped, and outputs a logic control unit signal providing a result of the decision to the drive stoppage command unit;
        the drive stoppage command unit includes a determining circuit which determines whether or not the first power supply voltage is less than or equal to a predetermined first voltage; the determining circuit comprising:
            a voltage divider circuit which divides the second power supply voltage and generates the first voltage; and
            a comparator which compares the first power supply voltage with the first voltage generated by the voltage divider circuit, and outputs a comparator signal showing a result of the comparison; and
        the drive stoppage command unit commands the drive unit to stop driving the pickup head and the objective lens in any one of first to third cases, the first case being where the determining circuit determines that the first power supply voltage is less than or equal to the first voltage, the second case being a where the second power supply unit signal shows that the second power supply voltage is less than or equal to the second voltage, and the third case being where the logic control unit signal shows that the driving of the pickup head and of the objective lens should be stopped.

2. The optical disk device according to claim 1, further comprising a third power supply unit which performs supply of power to the first power supply unit and to the second power supply unit, wherein the third power supply unit is an AC-DC power supply.

* * * * *